US008846963B2

(12) United States Patent
Abe et al.

(10) Patent No.: US 8,846,963 B2
(45) Date of Patent: Sep. 30, 2014

(54) PRODUCTION PROCESS FOR REFINED FAT OR OIL

(75) Inventors: Testuya Abe, Kamisu (JP); Minoru Kase, Kamisu (JP); Shinpei Fukuhara, Kamisu (JP); Toshiteru Komatsu, Kamisu (JP); Keiji Shibata, Kamisu (JP)

(73) Assignee: KAO Corporation, Tokyo (JP)

(*) Notice: Subject to any disclaimer, the term of this patent is extended or adjusted under 35 U.S.C. 154(b) by 49 days.

(21) Appl. No.: 13/634,895

(22) PCT Filed: Feb. 25, 2011

(86) PCT No.: PCT/JP2011/054305
§ 371 (c)(1),
(2), (4) Date: Sep. 14, 2012

(87) PCT Pub. No.: WO2011/114862
PCT Pub. Date: Sep. 22, 2011

(65) Prior Publication Data
US 2013/0012733 A1    Jan. 10, 2013

(30) Foreign Application Priority Data

Mar. 17, 2010   (JP) ................. 2010-060980

(51) Int. Cl.
C11B 3/14    (2006.01)
C11B 3/10    (2006.01)
C11B 3/12    (2006.01)
A23D 9/013   (2006.01)
C11B 3/00    (2006.01)

(52) U.S. Cl.
CPC . *A23D 9/013* (2013.01); *C11B 3/14* (2013.01); *C11B 3/001* (2013.01)
USPC ............................. 554/205; 554/191; 554/192

(58) Field of Classification Search
CPC .............. C11B 3/00; C11B 3/10; C11B 3/12; C11B 113/14; C11C 1/08; C11C 1/10
USPC ......................................... 554/191, 193, 205
See application file for complete search history.

(56) References Cited

U.S. PATENT DOCUMENTS

| 4,599,143 | A | 7/1986 | Stage |
| 4,601,790 | A | 7/1986 | Stage |
| 2006/0161012 | A1 | 7/2006 | Maruyama et al. |
| 2008/0071101 | A1 | 3/2008 | Maruyama et al. |
| 2011/0206804 | A1 | 8/2011 | Kase et al. |
| 2012/0177791 | A1 | 7/2012 | Kase et al. |
| 2012/0258232 | A1 | 10/2012 | Kase et al. |

FOREIGN PATENT DOCUMENTS

| CN | 101455242 A | 6/2009 |
| CN | 101659902 A | 3/2010 |
| JP | 59-68398 | 4/1984 |
| JP | 3 7240 | 2/1991 |
| JP | 37240 B2 * | 2/1991 |
| JP | 4 261497 | 9/1992 |
| JP | 4261497 A * | 12/1992 |
| JP | 2005-124439 | 5/2005 |
| JP | 2006 174808 | 7/2006 |
| JP | 2006174808 A * | 7/2006 |
| JP | 2009 40854 | 2/2009 |
| JP | 2011-30482 A | 2/2011 |
| JP | 2011 63702 | 3/2011 |
| JP | 2011 74358 | 4/2011 |
| WO | 2009/075278 A1 | 6/2009 |

OTHER PUBLICATIONS

Weisshaar et al, European Journal of Lipid Science and Technology, Feb. 2010 , vol. 112 , No. 2, pp. 158-165.*
Bauer, Dtsch Lebensm Rundsch, Jun. 2009, vol. IOS, No. 6, pp. 361 and 362.*
Office Action issued on Mar. 13, 2013 for Chinese Patent Application No. 201180011324.X.
Yunguo Ma, "Processing technology and equipments for oil and fat", Chemical Industry Publishers, Jan. 2003, pp. 90-96 with cover pages and English translation.
U.S. Appl. No. 13/635,542, Sep. 17, 2012, Fukuhara, et al.
Weisshaar, R., et al., "Fatty acid esters of glycidol in refined fats and oils," European Journal of Lipid Science and Technology, vol. 112, No. 2, pp. 158 to 165, (Feb. 2010).
Bauer, N., "Glycidol-Fettsaeureester in Saeuglingsmilchnahrung nachgewiesen," DLR, vol. 105, No. 6, pp. 361 to 362, (Jun. 2009).
International Search Report Issued May 31, 2011 in PCT/JP11/54305 Filed Feb. 25, 2011.
Franke et al.—"Influence of chemical refining process and oil type on bound 3-chloro-1, 2-propanediol contents in palm oil and rapeseed oil", LWT-Food Science and Technology 42 (2009), pp. 1751-1754.

* cited by examiner

Primary Examiner — Deborah D Carr
(74) Attorney, Agent, or Firm — Oblon, Spivak, McClelland, Maier & Neustadt, L.L.P.

(57) ABSTRACT

A method for manufacturing a refined fat or oil, including: carrying out a first steam treatment of bringing a fat or oil into contact with water vapor; subsequently carrying out a treatment of bringing the fat or oil into contact with an adsorbent; and further carrying out a second steam treatment of bringing the fat or oil having a temperature lower by 10° C. or more than a temperature of the fat or oil in the first steam treatment into contact with water vapor.

15 Claims, No Drawings

PRODUCTION PROCESS FOR REFINED FAT OR OIL

CROSS REFERENCES TO RELATED APPLICATIONS

This application is a 371 of International Patent Application No. PCT/JP11/054305, filed on Feb. 25, 2011, and claims priority to Japanese Patent Application No. 2010-060980, filed on Mar. 17, 2010.

FIELD OF THE INVENTION

The present invention relates to a method for manufacturing a refined fat or oil with less by-products, and good taste and flavor and hue.

BACKGROUND OF THE INVENTION

A fat or oil is essential for a human body as nutrients and source of energy supply (the primary function), and moreover, are important for providing so-called sensory function (the secondary function), which satisfies palatability of foods, for example, taste or aroma. In addition, a fat or oil containing diacylglycerols at a high concentration is known to show physiological effects (the third function) such as body fat-burning effect.

An untreated fat or oil obtained by squeezing seeds, germs, pulp, and the like of plants contains, for example, fatty acids, monoacylglycerols, and odor components. Further, when the untreated fat or oil is processed, trace components are generated as by-products through a heating step such as a transesterification reaction, an esterification reaction, or a hydrogenation treatment, resulting in the deterioration of the taste and flavor of the resultant fat or oil. It is necessary to improve taste and flavor by removing these by-products in order to use the fat or oil as edible oils. Thus, a process of so-called deodorization, in which the fat or oil is brought into contact with water vapor under reduced pressure at high temperature, is generally performed (Patent Document 1).

Further, for a diacylglycerol-rich fat or oil, a method involving adding an organic acid to the fat or oil rich in diacylglycerols and then carrying out a decoloration treatment with a porous adsorbent, followed by deodorization treatment, so as to provide good taste and flavor (Patent Document 2), or a method involving carrying out an esterification reaction between glycerin and each of fatty acids obtained by hydrolyzing a raw material fat or oil by an enzymatic decomposition method and then carrying out a deodorization treatment so that the deodorization time and the deodorization temperature can be each controlled in a given range (Patent Document 3).

PRIOR ART DOCUMENT

Patent Document

[Patent Document 1] JP-B-3-7240
[Patent Document 2] JP-A-4-261497
[Patent Document 3] JP-A-2009-40854

SUMMARY OF THE INVENTION

The present invention relates to the following items (1) to (18).
(1) A method for manufacturing a refined fat or oil, including: carrying out a first steam treatment of bringing a fat or oil into contact with water vapor; subsequently carrying out a treatment of bringing the fat or oil into contact with an adsorbent; and further carrying out a second steam treatment of bringing the fat or oil having a temperature lower by 10° C. or more than a temperature of the fat or oil in the first steam treatment into contact with water vapor.
(2) The method for manufacturing a refined fat or oil according to the item (1), in which the temperature of the fat or oil in the first steam treatment is from 200 to 280° C.
(3) The method for manufacturing a refined fat or oil according to the item (1), in which the temperature of the fat or oil in the first steam treatment is from 210 to 275° C.
(4) The method for manufacturing a refined fat or oil according to the item (1), in which the temperature of the fat or oil in the first steam treatment is from 220 to 270° C.
(5) The method for manufacturing a refined fat or oil according to the item (1), in which the temperature of the fat or oil in the first steam treatment is from 230 to 260° C.
(6) The method for manufacturing a refined fat or oil according to the item (1), in which the temperature of the fat or oil in the first steam treatment is from 230 to 240° C.
(7) The method for manufacturing a refined fat or oil according to any one of the items (1) to (6), in which the temperature of the fat or oil in the second steam treatment is from 120 to 220° C.
(8) The method for manufacturing a refined fat or oil according to any one of the items (1) to (6), in which the temperature of the fat or oil in the second steam treatment is from 140 to 200° C.
(9) The method for manufacturing a refined fat or oil according to any one of the items (1) to (6), in which the temperature of the fat or oil in the second steam treatment is from 160 to 180° C.
(10) The method for manufacturing a refined fat or oil according to any one of the items (1) to (9), in which the adsorbent is used in an amount of less than 2 weight % relative to the fat or oil.
(11) The method for manufacturing a refined fat or oil according to any one of the items (1) to (9), in which the adsorbent is used in an amount of from 0.1 to less than 2 weight % relative to the fat or oil.
(12) The method for manufacturing a refined fat or oil according to any one of the items (1) to (9), in which the adsorbent is used in an amount of from 0.2 to 1.5 weight % relative to the fat or oil.
(13) The method for manufacturing a refined fat or oil according to any one of the items (1) to (9), in which the adsorbent is used in an amount of from 0.25 to 1.5 weight % relative to the fat or oil.
(14) The method for manufacturing a refined fat or oil according to any one of the items (1) to (9), in which the adsorbent is used in an amount of from 0.3 to 1.3 weight % relative to the fat or oil.
(15) The method for manufacturing a refined fat or oil according to any one of the items (1) to (9), in which the adsorbent is used in an amount of from 0.5 to 1 weight % relative to the fat or oil.
(16) The method for manufacturing a refined fat or oil according to anyone of the items (1) to (15), in which the adsorbent includes at least one member selected from activated carbon, silicon dioxide, and a solid acid.
(17) The method for manufacturing a refined fat or oil according to the item (16), in which the solid acid includes at least one member selected from acid clay and activated clay.

(18) The method for manufacturing a refined fat or oil according to any one of the items (1) to (17), in which the refined fat or oil contains diacylglycerols in an amount of 20 weight % or more.

MODES FOR CARRYING OUT THE INVENTION

In recent years, consumer demand for improvement of quality of an edible fat or oil has been largely growing, and consumers who are sensitive to taste and flavor and appearances have been remarkably increased. Thus, a fat or oil having higher purity and better taste and flavor and hue than conventional one is desired.

However, the inventors found that a conventional process of deodorization, which has been performed for improving the taste and flavor of a fat or oil, may even increase the amount of by-products. That is, when a deodorization treatment is carried out at low temperature, the effect of distilling odor components is small, resulting in the production of a fat or oil having poor taste and flavor and hue, and hence the deodorization treatment is necessary to be carried out at high temperature, but the inventors found that glycidol fatty acid esters are generated as different by-products in the deodorization treatment at high temperature. On the other hand, when a deodorization treatment is carried out at low temperature, the production of by-products can be suppressed to a certain extent, but the improvement of the taste and flavor and hue of the resultant fat or oil is insufficient. In particular, a fat or oil rich in diacylglycerols showed such tendency remarkably.

Accordingly, the present invention relates to providing a method for manufacturing a refined fat or oil with less by-products and having good taste and flavor and hue.

The inventors of the present invention have made various efforts for studying refining operation of a fat or oil. As a result, the inventors have found that a refined fat or oil with less by-products can be obtained through treating a fat or oil by bringing the fat or oil into contact with water vapor, subsequently bringing the fat or oil into contact with an adsorbent, and further treating the fat or oil by bringing the fat or oil into contact with water vapor under a milder condition than the condition under which the preceding treatment of bringing the fat or oil into contact with water vapor is carried out, and have also found that the refined fat or oil obtained through the above-mentioned treatments has good taste and flavor and hue.

According to the present invention, there is provided a refined fat or oil with less by-products and having good taste and flavor and hue.

A fat or oil used for the manufacturing method of the present invention refers to a fat or oil containing triacylglycerols and/or diacylglycerols.

By-products are easily generated by using diacylglycerols in refining step as compared with using triacylglycerols. Thus, it is more preferred to use a fat or oil containing diacylglycerols in the manufacturing method of the present invention. The content of diacylglycerols is preferably 20 weight % (hereinafter, simply described as "%") or more, more preferably 50% or more, and even more preferably 70% or more. The upper limit of the content is not particularly defined, and is preferably 99% or less, more preferably 98% or less, and even more preferably 97% or less.

The fat or oil containing diacylglycerols can be obtained through an esterification reaction between fatty acids derived from a raw material fat or oil, and glycerin a glycerolysis reaction between a raw material fat or oil and glycerin, or the like. These reactions are preferably carried out under enzymatically mild conditions by using a lipase or the like in view of excellent taste and flavor or the like.

The raw material fat or oil may be any of a vegetable fat or oil and an animal fat or oil. Specific examples thereof include rapeseed oil, sunflower oil, corn oil, soybean oil, rice oil, safflower oil, cottonseed oil, beef tallow, linseed oil, and fish oil.

(First Steam Treatment Step)

In the manufacturing method of the present invention, the step of bringing a fat or oil into contact with water vapor, that is, first steam treatment, is at first carried out.

In the manufacturing method of the present invention, the first steam treatment is basically carried out by steam distillation under reduced pressure, and examples thereof include a batch method, a semi-continuous method, and a continuous method. When the amount of the fat or oil to be treated is small, the batch method is preferably used, and when the amount is large, the semi-continuous method or the continuous method is preferably used.

Example of apparatus for the semi-continuous method includes a Girdler type deodorization apparatus composed of a deodorization tower equipped with several trays. The treatment is performed in this apparatus by supplying the fat or oil for deodorization from the upper part of the apparatus, bringing the fat or oil into contact with water vapor in a tray for an appropriate period of time, and supplying the fat or oil to the next lower tray so that the fat or oil is successively moved down intermittently.

Example of apparatus for the continuous method includes a thin-film deodorization apparatus filled with structures in which the fat or oil in a thin-film form can be brought into contact with water vapor.

The temperature of the fat or oil in the first steam treatment is preferably from 200 to 280° C., from the standpoints of increasing the efficiency of the treatment and improving the taste and flavor. This temperature is preferably from 210 to 275° C., more preferably from 220 to 270° C., even more preferably from 230 to 260° C., and even more preferably from 230 to 240° C., from the same standpoints as described above. Note that the phrase "temperature of the fat or oil in steam treatment" as used herein refers to the temperature of the fat or oil at the time of bringing the fat or oil into contact with water vapor.

The contact time is preferably from 0.5 to 120 minutes, more preferably from 1 to 60 minutes, even more preferably from 1 to 15 minutes, even more preferably from 2 to 10 minutes, and even more preferably from 5 to 10 minutes, from the standpoints of increasing the efficiency of the treatment and improving the taste and flavor.

The pressure is preferably from 0.01 to 4 kPa, more preferably from 0.05 to 1 kPa, even more preferably from 0.1 to 0.8 kPa, and even more preferably from 0.3 to 0.8 kPa, from the same standpoints as described above.

The amount of water vapor with which the fat or oil is brought into contact is preferably from 0.1 to 20%, more preferably from 0.2 to 10%, even more preferably form 0.3 to 5%, and even more preferably from 0.5 to 5%, relative to the amount of the fat or oil, from the same standpoints as described above.

(Adsorbent Contact Treatment)

In the manufacturing method of the present invention, a treatment of bringing the fat or oil into contact with an adsorbent is subsequently carried out. A porous adsorbent is preferably used as the adsorbent, and examples thereof include activated carbon, silicon dioxide, and a solid acid adsorbent. Examples of the solid acid adsorbent include acid clay, activated clay, activated alumina, silica gel, silica/alumina, and aluminum silicate. Each of the adsorbents may be used alone or two or more kinds thereof may be used in combination. Of those, a solid acid adsorbent is preferred, and acid clay and activated clay are more preferred, from the standpoints of reducing the content of by-products and of improving the taste and flavor and the hue.

Acid clay and activated clay, both of which include $SiO_2$, $Al_2O_3$, $Fe_2O_3$, CaO, MgO, and the like as common chemical components, each have an $SiO_2/Al_2O_3$ ratio of preferably from 3 to 12 and more preferably from 4 to 10. Further, acid clay and activated clay each including from 1 to 5% of $Fe_2O_3$, from 0 to 1.5% of CaO, and from 1 to 7% of MgO in their compositions are preferred.

Activated clay is prepared by treating naturally-occurring acid clay (montmorillonite-based clay) with a mineral acid such as sulfuric acid and is a compound that has a porous structure having a large specific surface area and a large adsorbing ability. It is known that an additional acid treatment of acid clay changes its specific surface area, improves its decoloration ability, and changes its physical properties. The specific surface area of acid clay or activated clay varies depending on, for example, the degree of the acid treatment, and is preferably from 50 to 400 $m^2/g$. The pH (5% suspension) thereof is preferably from 2.5 to 9 and more preferably from 3 to 7.

It is possible to use, as acid clay, for example, a commercially available product such as MIZUKA ACE #20 or MIZUKA ACE #400 (both manufactured by Mizusawa Industrial Chemicals, Ltd.). It is possible to use, as activated clay, for example, a commercially available product such as GALLEON EARTH V2R, GALLEON EARTH NV, or GALLEON EARTH GSF (all manufactured by Mizusawa Industrial Chemicals, Ltd.).

The adsorbent is used in an amount of preferably less than 2.0%, more preferably from 0.1% to less than 2.0%, even more preferably from 0.2 to 1.5%, even more preferably from 0.25 to 1.5%, even more preferably from 0.3 to 1.3%, and even more preferably from 0.5 to 1%, relative to the amount of the fat or oil, from the standpoint of increasing the rate of filtration, thereby improving the productivity and of providing a high yield.

The temperature at which the fat or oil is brought into contact with the adsorbent is preferably from 20 to 150° C., more preferably from 40 to 135° C., even more preferably from 60 to 120° C., and even more preferably from 105 to 120° C., from the standpoints of reducing the content of by-products and improving the industrial productivity.

Further, the contact time is preferably 3 to 180 minutes, more preferably from 5 to 120 minutes, even more preferably from 7 to 90 minutes, and even more preferably from 15 to 90 minutes, from the same standpoints as described above. Reduced pressure or normal pressure may be applied as a pressure, but reduced pressure is preferred from the standpoints of oxidation suppression and decoloration property.

(Second Steam Treatment)

In the manufacturing method of the present invention, a step of further bringing the fat or oil into contact with water vapor, that is, second steam treatment, is carried out.

The condition of the second steam treatment is preferably milder than that of the first steam treatment. Specifically, the fat or oil having a temperature lower by 10° C. or more than the temperature of the fat or oil in the first steam treatment is brought into contact with water vapor, from the standpoints of reducing the production amount of by-products and improving the taste and flavor. The temperature of the fat or oil in the second steam treatment is preferably lower by 15° C. or more, more preferably lower by 20° C. or more, even more preferably lower by 40° C. or more, and even more preferably lower by 70° C. to 100° C.

The temperature of the fat or oil in the second steam treatment is preferably 120 to 220° C., more preferably 140 to 200° C., and even more preferably 160 to 180° C., from the same standpoints as described above.

The contact time is preferably 0.5 to 120 minutes, more preferably 1 to 90 minutes, even more preferably 2 to 60 minutes, and even more preferably 34 to 60 minutes, from the standpoints of reducing the production amount of by-products and improving the taste and flavor.

The pressure is preferably 0.01 to 4 kPa, more preferably 0.05 to 1 kPa, even more preferably 0.1 to 0.8 kPa, and even more preferably 0.3 to 0.8 kPa, from the same standpoints as described above.

The amount of water vapor with which the fat or oil is brought into contact is preferably 0.3 to 20%, more preferably 0.5 to 10%, and even more preferably 1 to 5%, relative to the amount of the fat or oil, from the same standpoints as described above.

In the manufacturing method of the present invention, a refining step that is generally used for a fat or oil may be carried out before and/or after each manufacturing step of the fat or oil of the present invention. Specific examples thereof include a top cut distillation step, an acid treatment step, a decoloration step, and a water washing step. The top cut distillation step refers to a step of distilling a fat or oil, thereby removing light weight by-products such as fatty acids from the fat or oil. The acid treatment step refers to a step of adding chelating agents such as citric acid to a fat or oil, followed by mixing them, and subsequently subjecting the mixture to dehydration under reduced pressure, thereby removing impurities. The decoloration step refers to a step of bringing a fat or oil into contact with an adsorbent or the like, thereby additionally improving their hue and their taste and flavor. In the technique of the present application, a fat or oil is brought into contact with an adsorbent between the first steam treatment and the second steam treatment, and the decoloration step may be further carried out.

The water washing step refers to a step of bringing a fat or oil into contact with water, thereby performing oil-water separation. Water washing can remove water-soluble impurities. The water washing step is preferably repeated more than once (for example, three times).

As a result of the treatments of the present invention, it is possible to obtain a refined fat or oil with less by-products, in particular, glycidol fatty acid esters, and having good taste and flavor and hue.

Glycidol fatty acid esters can be measured by a method described in the Deutsche Gesellschaft für Fettwissenschaft standard method C-III 18(09) (DGF Standard Methods 2009 (14. Supplement), C-III 18(09), "Ester-bound 3-chloropropane-1,2-diol (3-MCPD esters) and glycidol (glycidyl esters)"). This measurement method is a measurement method for 3-chloropropane-1,2-diol esters (MCPD esters) and for glycidol and esters thereof. In the present invention, the method of Option A described in Section 7.1 of the Standard Methods ("7.1 Option A: Determination of the sum of ester-bound 3-MCPD and glycidol") is used to quantify glycidol esters. The details of the measurement method are described in examples.

Glycidol fatty acid esters and MCPD esters are different substances, but, in the present invention, each value obtained by the above-mentioned measurement method is defined as the content of glycidol fatty acid esters.

The content of glycidol fatty acid esters in the refined fat or oil of the present invention is preferably 7 ppm or less, more preferably 6 ppm or less, even more preferably 5 ppm or less, and even more preferably 3 ppm or less.

The hue of the refined fat or oil of the present invention is preferably 20 or less, more preferably 18 or less, even more preferably 16 or less, even more preferably 15 or less, and even more preferably 14 or less, the hue being the value of 10R+Y measured by the method described in Examples.

Further, the content of diacylglycerols in the refined fat or oil of the present invention is preferably 20% or more, more preferably 50% or more, and even more preferably 70% or more. The upper limit of the content is not particularly defined, and is preferably 99% or less, more preferably 98% or less, and even more preferably 97% or less.

An antioxidant can be added to the refined fat or oil of the present invention as is the case with a general edible fat or oil, for the purpose of improving its storage stability and the stability of its taste and flavor. Examples of the antioxidant include natural antioxidants, tocopherol, ascorbyl palmitate, ascorbyl stearate, BHT, BHA, and phospholipids.

The refined fat or oil of the present invention can be used in exactly the same applications as a general edible fat or oil, and can be widely applied to various foods and beverages in which a fat or oil is used. For example, the refined fat or oil of the present invention can be used in: oil-in-water fat and oil processed foods such as drinks, desserts, ice creams, dressings, toppings, mayonnaises, and grilled meat sauces; water-in-oil fat and oil processed foods such as margarines and spreads; processed fat and oil foods such as peanut butters, frying shortenings, and baking shortenings; processed foods such as potato chips, snacks, cakes, cookies, pies, breads, and chocolates; bakery mixes; processed meat products; frozen entrees; and frozen foods.

EXAMPLES (Method for Analysis)
(i) Hue

The hue means a value obtained by performing measurement with a 5.25-inch cell by using a Lovibond colorimeter according to "Color (2.2.1-1996)" in "Standard methods for the Analysis of Fats, Oils and Related Materials, Edition 2003" edited by Japan Oil Chemists' Society and making a calculation based on the following Equation (1).

$$\text{Hue}=10R+Y \quad (1)$$

(In the equation, R represents a red value and Y represents a yellow value.)

(ii) Measurement of Glycidol Fatty Acid Esters (in Accordance with Option A of Deutsche Gesellschaft für Fettwissenschaft (DGF) Standard Method C-III 18(09))

Approx. 100 mg of a fat or oil sample was weighed in a test tube with a lid. 50 µL of an internal standard substance, 500 µL of a t-butyl methyl ether/ethyl acetate-mixed solution (volume ratio of 8 to 2), and 1 mL of 0.5 N sodium methoxide were added to the fat or oil sample, followed by stirring, and the mixture was left to stand still for 10 minutes. 3 mL of hexane and 3 mL of a 3.3% acetic acid/20% sodium chloride aqueous solution were added thereto, followed by stirring, and the upper layer of the mixture was subsequently removed. 3 mL of hexane was further added, followed by stirring, and the upper layer of the mixture was removed. 250 µL of a mixed solution of 1 g of phenylboronic acid/4 mL of 95% acetone was added, followed by stirring, and subsequently the test tube was hermetically sealed and heated at 80° C. for 20 minutes. 3 mL of hexane was added thereto, followed by stirring, and the upper layer of the resultant mixture was subjected to measurement with a gas chromatograph-mass spectrometer (GC-MS) to quantify glycidol fatty acid esters. Note that the case where the content of glycidol fatty acid esters was found to be 0.144 ppm or less was defined as being not detectable (ND).

(iii) Glyceride Composition

Approx. 10 mg of fat or oil sample and 0.5 mL of trimethylsilylating agent ("Silylating Agent TH" manufactured by Kanto Chemical Co., Inc.) were loaded into a glass sample bottle, hermetically sealed, and heated at 70° C. for 15 minutes. 1.0 mL of water and 1.5 mL of hexane were added thereto, followed by shaking. After standing still, the upper layer was subjected to gas chromatography (GLC) for analysis.

(Taste and Flavor)

The evaluation of taste and flavor of each refined fat or oil was performed by panelists consist of five members. Each member ate 1 to 2 g of the each refined fat or oil raw, and performed a sensory evaluation based on the criteria shown below. The average of the five evaluations was rounded off to the nearest whole number. Note that when the refined fat or oil is evaluated as 4 or higher, the refined fat or oil is determined to be highly accepted by consumers.

| (Criteria for evaluation of taste and flavor) | |
|---|---|
| 5: | Very good |
| 4: | Good |
| 3: | Slightly good |
| 2: | Poor |
| 1: | Very poor |

(Preparation of Fat or Oil)

100 parts by weight of mixed fatty acids (soybean oil fatty acids:rapeseed oil fatty acids=7:3 (weight ratio)), the fatty acids being obtained from the corresponding non-deodorized raw material fat or oil, and 15 parts by weight of glycerin were mixed, and the mixture was subjected to an esterification reaction with an enzyme. From the resultant esterified product, fatty acids and monoacylglycerols were removed by top cut distillation, and the resultant was then treated with acid (50% aqueous solution of citric acid was added in an amount of 0.5%) at 80° C. and washed three times with distilled water in an amount of 10% relative to the fat or oil, to yield DAG water-washed oil (containing 88% of diacylglycerols). The DAG water-washed oil had a hue of 47 and contained glycidol fatty acid esters in an amount of 1.4 ppm.

Examples 1 to 6

First Steam Treatment

The DAG water-washed oil was subjected to a thin-film type continuous deodorization treatment under Condition (1) shown in Table 1, to yield first steam treatment fat or oil samples a and b.

(Adsorbent Contact Treatment)

Each of the fat or oil samples a and b was subjected to a contact treatment with an adsorbent while stirring under reduced pressure and Condition (2) shown in Table 1, followed by removal of the adsorbent through filtration, to yield adsorbent treatment fat or oil samples c to e.

Second Steam Treatment

Each of the resultant fat or oil samples c to e was subjected to a batch type deodorization treatment under Condition (3) shown in Table 1. 200 g of each of the fat or oil samples was loaded into a 500-ML glass Claisen's flask, followed by a contact treatment with water vapor, to yield refined fat or oil samples (Examples 1, 2, and 5). Note that, in Examples 3, 4, and 6, before carrying out a contact treatment with water vapor, each of the fat or oil samples was treated with acid (50% aqueous solution of citric acid was added in an amount of 0.5%) at 80° C. and washed three times with distilled water in an amount of 10% relative to the fat or oil, followed by a second steam treatment. Table 1 shows the results.

Comparative Example 4

Omission of Adsorbent Contact Treatment

The DAG water-washed oil was subjected to a thin-film type continuous deodorization treatment under Condition (1) shown in Table 1, to yield a first steam treatment fat or oil sample a.

Subsequently, the fat or oil sample a was subjected to a batch type deodorization treatment under Condition (3) shown in Table 2. 200 g of the fat or oil sample was loaded into a 500-ML glass Claisen's flask and then subjected to a contact treatment with water vapor, to yield a fat or oil sample (Comparative Example 4). Table 2 shows the results.

TABLE 1

|  |  |  | Example 1 | Example 2 | Example 3 | Example 4 | Example 5 | Example 6 |
|---|---|---|---|---|---|---|---|---|
| Treatment steps | Condition (1) (first steam treatment) | Temperature [° C.] | 240 | 240 | 240 | 240 | 270 | 270 |
|  |  | Pressure [kPa] | 0.3 | 0.3 | 0.3 | 0.3 | 0.3 | 0.3 |
|  |  | Contact time [min] | 5 | 5 | 5 | 5 | 5 | 5 |
|  |  | Water vapor [%-to oil] | 0.5 | 0.5 | 0.5 | 0.5 | 0.5 | 0.5 |
|  | Fat or oil sample |  | a | a | a | a | b | b |
|  | Condition (2) (adsorbent treatment) | Temperature [° C.] | 105 | 105 | 105 | 105 | 105 | 105 |
|  |  | Contact time [min] | 20 | 20 | 20 | 20 | 20 | 20 |
|  |  | Type of adsorbent | Activated clay | Activated clay | Activated clay | Activated clay | Activated clay | Activated clay |
|  |  | Addition amount [%] | 0.25 | 0.5 | 0.25 | 0.5 | 0.5 | 0.5 |
|  | Fat or oil sample |  | c | d | c | d | e | e |
|  | Acid treatment | Addition amount [%] | No treatment | No treatment | 0.25 | 0.25 | No treatment | 0.25 |
|  | Water washing | Frequency | No washing | No washing | 3 | 3 | No washing | 3 |
|  | Condition (3) (second steam treatment) | Temperature [° C.] | 170 | 170 | 170 | 170 | 170 | 170 |
|  |  | Pressure [kPa] | 0.3 | 0.3 | 0.3 | 0.3 | 0.3 | 0.3 |
|  |  | Contact time [min] | 34 | 34 | 34 | 34 | 34 | 34 |
|  |  | Water vapor [%/hr-to oil] | 3 | 3 | 3 | 3 | 3 | 3 |
|  |  | Water vapor [%-to oil] | 1.7 | 1.7 | 1.7 | 1.7 | 1.7 | 1.7 |
| Refined fat or oil | DAG [%] |  | 89 | 88 | 89 | 88 | 89 | 89 |
|  | Glycidol fatty acid esters [ppm] |  | 0.4 | 0.3 | 0.3 | 0.2 | 0.3 | 0.3 |
|  | Hue |  | 13 | 13 | 14 | 13 | 11 | 11 |
|  | Evaluation of taste and flavor |  | 4 | 4 | 5 | 5 | 4 | 5 |

Activated clay: GALLEON EARTH V2R (manufactured by Mizusawa Industrial Chemicals, Ltd.)

Comparative Examples 1 and 2

Omission of Adsorbent Treatment and Second Steam Treatment

The DAG water-washed oil was subjected to a thin-film type continuous deodorization treatment under Condition (1) shown in Table 2, to yield fat and oil samples a and b (Comparative Examples 1 and 2). Table 2 shows the results.

Comparative Example 3

Omission of Adsorbent Treatment and Second Steam Treatment 200 g of the DAG water-washed oil was loaded into a 500-ML glass Claisen's flask and subsequently subjected to a contact treatment with water vapor for 34 minutes under Condition (1) shown in Table 2, thereby performing a batch type deodorization treatment, to yield a fat or oil sample f (Comparative Example 3). Table 2 shows the results.

Comparative Examples 5 and 6

Omission of Second Steam Treatment

The DAG water-washed oil was subjected to a thin-film type continuous deodorization treatment under Condition (1) shown in Table 1, to yield a first steam treatment fat or oil sample a.

Subsequently, the fat or oil sample a was subjected to a contact treatment with an adsorbent while stirring under reduced pressure and Condition (2) shown in Table 2, followed by removal of the adsorbent through filtration, to yield fat or oil samples c and d (Comparative Examples 5 and 6). Table 2 shows the results.

Comparative Example 7

Omission of First Steam Treatment

The DAG water-washed oil was subjected to a contact treatment with an adsorbent while stirring under reduced pressure and Condition (2) shown in Table 2, followed by removal of the adsorbent through filtration, to yield a fat or oil sample g. Subsequently, the fat or oil sample g was subjected to a batch type deodorization treatment under Condition (3)

shown in Table 2. 200 g of the fat or oil sample was loaded into a 500-ML glass Claisen's flask and then subjected to a contact treatment with water vapor, to yield a fat or oil sample (Comparative Example 7). Table 2 shows the results.

Comparative Example 8

Omission of First Steam Treatment and Adsorbent Treatment

The DAG water-washed oil was subjected to a batch type deodorization treatment under Condition (3) shown in Table 2. 200 g of the fat or oil sample was loaded into a 500-ML glass Claisen's flask and subsequently subjected to a contact treatment with water vapor, to yield a fat or oil sample (Comparative Example 8). Table 2 shows the results.

the second steam treatment under a milder condition, and when a refined fat or oil was manufactured by carrying out only the second steam treatment under a milder condition without carrying out the first steam treatment and the contact treatment with an adsorbent, the refined fat or oil had lower contents of glycidol fatty acid esters, but had unsatisfactory taste and flavor and appearances (Comparative Examples 7 and 8).

The invention claimed is:

1. A method for manufacturing a refined fat or oil, comprising:
   carrying out a first steam treatment of bringing a fat or oil into contact with water vapor;
   subsequently carrying out a treatment of bringing said fat or oil into contact with an adsorbent; and

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Treatment steps | Condition (1) (first steam treatment) | Temperature [° C.] | 240 | 270 | 200 | 240 | 240 | 240 | No treatment | No treatment |
| | | Pressure [kPa] | 0.3 | 0.3 | 0.3 | 0.3 | 0.3 | 0.3 | | |
| | | Contact time [min] | 5 | 5 | 34 | 5 | 5 | 5 | | |
| | | Water vapor [%-to oil] | 0.5 | 0.5 | 1.7 | 0.5 | 0.5 | 0.5 | | |
| | Fat or oil sample | | a | b | f | a | a | a | | |
| | Condition (2) (adsorbent treatment) | Temperature [° C.] | No treatment | No treatment | No treatment | No treatment | 105 | 105 | 105 | No treatment |
| | | Contact time [min] | | | | | 20 | 20 | 20 | |
| | | Type of adsorbent | | | | | Activated clay | Activated clay | Activated clay | |
| | | Addition amount [%] | | | | | 0.25 | 0.5 | 0.5 | |
| | Fat or oil sample | | a | b | f | a | c | d | g | Water-washed oil |
| | Condition (3) (second steam treatment) | Temperature [° C.] | No treatment | No treatment | No treatment | 170 | No treatment | No treatment | 170 | 180 |
| | | Pressure [kPa] | | | | 0.3 | | | 0.3 | 0.3 |
| | | Contact time [min] | | | | 34 | | | 34 | 34 |
| | | Water vapor [%/hr-to oil] | | | | 3 | | | 3 | 3 |
| | | Water vapor [%-to oil] | | | | 1.7 | | | 1.7 | 1.7 |
| Refined fat or oil | DAG [%] | | 89 | 89 | 87 | 88 | 88 | 88 | 88 | 88 |
| | Glycidol fatty acid esters [ppm] | | 9.6 | 70.6 | 3.3 | 9.7 | 0.2 | 0.0 | 0.3 | 1.3 |
| | Hue | | 17 | 13 | 25 | 17 | 14 | 13 | 16 | 38 |
| | Evaluation of taste and flavor | | 5 | 5 | 2 | 5 | 1 | 1 | 2 | 2 |

Activated clay: GALLEON EARTH V2R (manufactured by Mizusawa Industrial Chemicals, Ltd.)

As evident from Table 1, a refined fat or oil with less glycidol fatty acid esters and having good taste and flavor and hue was able to be obtained by carrying out a first steam treatment of bringing a fat or oils into contact with water vapor, subsequently carrying out a treatment of bringing the fat or oil into contact with an adsorbent, and further carrying out a second steam treatment of bringing the fat or oil into contact with water vapor under a milder condition than the condition of the first steam treatment.

On the other hand, as shown in Table 2, a refined fat or oil manufactured by omitting the contact treatment with an adsorbent had higher contents of glycidol fatty acid esters (Comparative Examples 1 to 4). When a fat or oil had a higher temperature at the time of the steam treatment, particularly large amounts of glycidol fatty acid esters were produced (Comparative Example 2). In contrast, when a fat or oil had a lower temperature at the time of the steam treatment, the resultant refined fat or oil had unsatisfactory taste and flavor and appearances (Comparative Example 3). Further, refined fat or oil manufactured by omitting the second steam treatment had poor taste and flavor (Comparative Examples 5 and 6). When a refined fat or oil was manufactured by performing the contact treatment with an adsorbent without carrying out the first steam treatment and subsequently carrying out only further carrying out a second steam treatment of bringing said fat or oil having a temperature lower by 10° C. or more than a temperature of the fat or oil in the first steam treatment into contact with water vapor,
wherein the temperature of said fat or oil in said first steam treatment is from 200 to 280° C., and
wherein the temperature of said fat or oil in said second steam treatment is from 140 to 200° C.

2. The method for manufacturing a refined fat or oil according to claim 1, wherein the temperature of said fat or oil in said first steam treatment is from 210 to 275° C.

3. The method for manufacturing a refined fat or oil according to claim 1, wherein the temperature of said fat or oil in said first steam treatment is from 220 to 270° C.

4. The method for manufacturing a refined fat or oil according to claim 1, wherein the temperature of said fat or oil in said first steam treatment is from 230 to 260° C.

5. The method for manufacturing a refined fat or oil according to claim 1, wherein the temperature of said fat or oil in said first steam treatment is from 230 to 240° C.

6. The method for manufacturing a refined fat or oil according to claim 1, wherein the temperature of said fat or oil in said second steam treatment is from 160 to 180° C.

7. The method for manufacturing a refined fat or oil according to claim 1, wherein said adsorbent is present in an amount of less than 2 weight % relative to said fat or oil.

8. The method for manufacturing a refined fat or oil according to claim 1, wherein said adsorbent is present in an amount of from 0.1 to less than 2 weight % relative to said fat or oil.

9. The method for manufacturing a refined fat or oil according to claim 1, wherein said adsorbent is present in an amount of from 0.2 to 1.5 weight % relative to said fat or oil.

10. The method for manufacturing a refined fat or oil according to claim 1, wherein said adsorbent is present in an amount of from 0.25 to 1.5 weight % relative to said fat or oil.

11. The method for manufacturing a refined fat or oil according to claim 1, wherein said adsorbent is present in an amount of from 0.3 to 1.3 weight % relative to said fat or oil.

12. The method for manufacturing a refined fat or oil according to claim 1, wherein said adsorbent is present in an amount of from 0.5 to 1 weight % relative to said fat or oil.

13. The method for manufacturing a refined fat or oil according to claim 1, wherein said adsorbent comprises at least one member selected from the group consisting of activated carbon, silicon dioxide, and a solid acid.

14. The method for manufacturing a refined fat or oil according to claim 13, wherein said solid acid comprises at least one member selected from the group consisting of acid clay and activated clay.

15. The method for manufacturing a refined fat or oil according to claim 1, wherein said refined fat or oil comprises diacylglycerols in an amount of 20 weight % or more.

* * * * *